Jan. 14, 1941.  W. D. HARVEY  2,228,954
BATTERY BROODER
Filed Oct. 16, 1939

INVENTOR.
WILLIAM DOW HARVEY.
BY Lockwood, Goldsmith & Galt
ATTORNEYS.

Patented Jan. 14, 1941

2,228,954

UNITED STATES PATENT OFFICE 2,228,954

BATTERY BROODER

William Dow Harvey, Macomb, Ill., assignor to Globe American Corporation, Kokomo, Ind., a corporation Application October 16, 1939, Serial No. 299,585

1 Claim. (Cl. 119—34)

This invention relates to a battery brooder for young fowl or chicks, and particularly to its construction for heating the several superimposed sections or cages.

In battery brooders it is necessary to provide a source of heat or heated surface in each cage in the battery at some location therein so that young fowl or chicks may periodically warm themselves. It has been common practice to provide such heat by discharging heated air into the sections or cages, by conducting heat through pipes or tubes of various shapes, or by providing each of them with an individual heater.

It is the purpose of this invention to improve upon these several means of supplying heat by applying the heat directly to the metal wall of the battery and its several sections by means of a common manifold extending upwardly from a central source of heat and carrying hot gases which are vented at or near its top. Thus, the hot gases may be discharged from a central oil burning heater, located at the bottom and to one side of the battery, into the manifold so as to pass upwardly therethrough, the manifold including one wall of each of the battery sections and being provided with suitable baffles. Such gases are caused to thereby flow over and contact the battery wall so as to effect the desired heating of the adjacent compartment of each section or cage through convection and radiation.

Another feature of the invention resides in the provision of fixed baffles within the manifold and effective with respect to each of the sections for the purpose of securing an even heating thereof from top to bottom by evenly apportioning the heat from the rising gases in the manifold to the wall of each section. This is accomplished by arranging the fixed baffles to retard the passage of the heated gases upwardly, and thereby positively control the amount of heat absorbed into each section of the battery wall. Thus the usual adjustable dampers or baffles are dispensed with as being impractical, and a more efficient heating system with increased simplicity of construction and ease of operation is provided. To this end the fixed baffles are of predetermined arrangement to more effectively maintain approximately the same temperature in each compartment.

Other objects and features of the invention will be understood from the accompanying drawing and the following description and claim:

Fig. 1 is a rear elevation of a battery brooder showing the heating manifold extending over the rear walls of the several sections or cages. Fig. 2 is the same as Fig. 1 showing a side elevation thereof with parts broken away. Fig. 3 is a cross section taken on the line 3—3 of Fig. 2.

In the drawing there is shown, for example, a five-section battery brooder, it being understood that the battery may comprise any desired number of sections. Such batteries comprise primarily the base frame 10 provided with corner legs 11 and casters 12. Each section is formed of the usual rectangular framework indicated at 13, the frames of each section being superposed one upon the other and bolted together. The frames of each section carry the enclosing grids indicated at 14 to provide the cages, and support the exteriorly mounted feed or water troughs, of the usual character, as indicated at 14a. The back wall of each section is provided with a sheet metal closure 15, from which the curtains 16 extend a short distance along each side of the section to provide a heat retaining compartment associated with each cage. The chicks may huddle against the heated back wall which radiates sufficient heat into the compartment partially enclosed by the rear walls 15 and curtains 16, to meet the requirements.

The required heat is supplied by a common manifold or flue 17 which extends vertically along the back walls of the sections. The lower end of said flue is provided with a flared canopy 18 under which an oil burner 19 is positioned to discharge hot gases therein, said burner being fed from a suitable fuel tank 20 controlled by the valve 21. Opposite the flared canopy 18, and interiorly of the lowermost section, there is provided a guard plate 18a to protect the chicks from the hot spot in the wall 15 caused by the close proximity of the stove and canopy.

The inner wall of the flue comprises a substantial portion of the superimposed back walls 15 of the respective sections, while the outer wall thereof is slightly spaced from said back walls with its side portions bolted thereto through the flanges 22.

At spaced intervals, and adjacent the upper portion of each section of the battery, there are provided within the flue, the hot gas baffles 23, 24, 25, 26 and 27. These baffles are permanently secured in place by the bolts 28 so that they are non-adjustable. They extend the full width of the flue along the inner surface of the outer wall thereof. However, they are designed to terminate short of the walls 15, to provide restricted passages for the hot gases and direct them along the surface of said walls.

In order to distribute the heating effect of the hot gases evenly throughout the several sections of the battery, the baffles are constructed to vary in size and thereby vary the restricted passages for the gases. Thus, said baffles are progressively wider from the bottom toward the top and the passages become progressively more restricted, so that as the heat becomes more dissipated toward the upper end of the flue, the flow of gases will be more retarded. However, in some installations it may be found desirable to make an exception to the bottom baffle, restricting its passage sufficiently to retard the initial upward velocity of the hot gases due to its close proximity to the heater.

In practice, wherein a varying number of sections may be built up, auxiliary extension baffles may be provided to be applied to the standard baffles. For example, wherein the standard baffles are secured to the flue for a five-section battery, in event it is reduced to three sections, the auxiliary baffles may be secured in place to reduce the passages so as to offer greater restriction to the passages of the gases.

In the foregoing, it will be observed that a simplified and effective arrangement is provided for supplying the desired heating effect to each section or superimposed cage in a battery brooder, all from a single source of heat and with substantially even dissipation.

The invention claimed is:

A battery brooder comprising a plurality of superposed cage sections, each section having a compartment to be heated, a manifold flue common to all of said compartments and extending vertically adjacent to one side of said brooder, said flue being formed exteriorly of said compartments with one side thereof comprising a sheet metal wall common to said flue and said compartments, a series of baffle structures in said flue progressively varying in restrictive area, each baffle being positioned opposite the respective upper portion of a section, and fixed to extend inwardly toward said common wall but spaced therefrom a greater distance in respect to the lower than the upper compartments, and a source of hot gases positioned below the lower of said cage sections and under the lower open end of said flue to discharge said gases therethrough, whereby the heat carried thereby will be evenly distributed to said compartments through the common wall.

WILLIAM DOW HARVEY.